3,654,218
PROCESS OF FORMING AN ELASTOMER-CARBON BLACK MIXTURE
Willi Clas, Wesseling, and Wolfgang Buchel, Wesseling-Berzdorf, Germany, assignors to Deutsche Gold- und Silber-Scheideanstalt vormals Roessler, Frankfurt am Main, Germany
No Drawing. Filed Aug. 22, 1969, Ser. No. 852,475
Claims priority, application Germany, Aug. 24, 1968, P 17 95 222.6
Int. Cl. C08c *11/00, 11/18*
U.S. Cl. 260—41.5
6 Claims

ABSTRACT OF THE DISCLOSURE

A rubber latex is coagulated in the presence of an aqueous dispersion of finely divided carbon black, the dispersion being formed at a pH of 1 to 2. The coagulate may then be subjected to washing, filtering and drying and the thus-formed granulate may subsequently be subjected to a grinding step. The granulate has substantially no tendency to cake without the necessity of adding additional separating agents.

BACKGROUND OF THE INVENTION

The invention relates to a process of making pulverulent mixtures of elastomers and activated carbon which may additionally contain the usual vulcanization additives.

Carbon containing elastomers mixtures have already been prepared in the art as premixes, the so-called master batches, by coagulating a latex of natural or synthetic rubber. It is also known to add the carbon black by mechanically intermixing it with the dry or wet solid rubber by means of a kneader, for instance, an internal kneader with or without addition of certain oils such as naphthenic or aromatic mineral oils to improve the mixing process. In this manner solid blocks were obtained which however caused difficulties in further processing. Usually the blocks had to be subdivided by splitting or other comminution for instance in a so-called pelletizer in order to form granulates.

The manufacturers of these master batches therefore have endeavored to provide the premixed compositions in pearl or granulate form for use by the processor. However, these granulates still have a tendency for caking together and special separating agents such as zinc stearate are necessary to obviate this tendency.

The invention therefore has the object to provide for a pulverulent mixture of elastomers and activated carbon black employing natural or synthetic rubbers which avoids the shortcomings of the prior art.

SUMMARY OF THE INVENTION

The process of the invention involves the coagulation of a natural or synthetic rubber latex in the presence of an aqueous acidic dispersion of finely divided carbon black which dispersion is formed at a pH between 1 and 2.

DESCRIPTION OF THE PREFERRED EMBODIMENTS

Preferably the dispersion of the activated carbon black in powder or granulated form is prepared in acidified water at room temperature and at a pH between 1 and 2 within a time of from 2 to 5 minutes, preferably 3 minutes. The dispersing of the carbon black is effected preferably by a mixer having a steep velocity gradient. The dispersion is then added to a ruber latex within a period of from 5 to 8 minutes and with intensive stirring. Coagulation is effected by addition of acid at a pH between 1.5 and 2.

The coagulation of the latex in the presence of the carbon black dispersion formed in the acidic range permits to obtain a coagulate which after subsequent washing, filtration and conventional drying, for instance spray drying is in the form of a granulate which does not have the tendency to cake although no additional separating agents are added.

The granulate can then be pulverized in a simple grinding process. All the usual vulcanization additives may be added to the powder by simple stirring in conventional mixers such as stirrers or screw mixers. By "vulcanization additives" within the context of this invention all materials are to be understood which are normally required for vulcanization such as accelerators, zinc oxide, stearic acid, sulfur, anti-aging agents, oils for use during processing, etc. The oils can also be added in the conventional dosage immediately during the coagulation.

These carbon black-elastomer pulverulent mixtures of the invention can be further processed on the conventional machines as in use in the rubber industry, such as calenders, extruders or injection molds. The further processing may also be effected by putting the materials in solution. The final vulcanization can be carried out in conventional manner.

In order to increase the storage and shipping stability of products placed in bags, bins or other containers it is preferable to add a superfine dispersed dry silicic acid to the carbon black elastomer mixture of the invention for the purpose of grinding the granulate. The amount added should preferably be between about 0.5 and 5.0 weight parts relative to 100 parts of the mixture. Particularly advantageous is an addition of about 1%. This will improve the grinding properties and will prevent caking of the powder even when under pressure or at increased storage temperatures.

The dosage of the carbon black can be varied between 30 and 100 weight parts relative to 100 weight parts of elastomer. In the context of the invention all conventional carbon blacks used in the rubber industry may be employed and the carbon blacks may have any desired degree of activity, particle size and structure.

The following example will further illustrate the invention:

(A) Suspension of the carbon black 400 grams of carbon black granulate or powder are dispersed in 6 liter of water at room temperature (24° C.) and a pH between 1 and 2 (3–3.5 N sulfuric acid). The dispersion is effected during a period of 3 minutes by means of a so-called Kotthoff mixer with 2,000 r.p.m. and a steep velocity gradient so as to employ a high shearing force. Subsequently 4 liters of water are added. The carbon black dispersion is then in the form of a superfine dispersion and can further be used for the coagulation.

(B) Coagulation

The coagulation of the above-formed dispersion in the latex was effected at 24° C. 800 grams of rubber consisting of 3,2 liters styrene butadiene latex and 126 grams of a 10% fatty alcohol-polyglycol ether solution plus 8 grams of an alkylated or styrene base or phenolic anti-aging agent were added to the aqueous carbon black dispersion thus prepared. The addition was effected within a period of 5 to 8 minutes upon vigorous stirring by means of a high power mixer and upon maintaining a pH value between 1.5 and 2.0. Thus an intimate mixture was formed.

The resulting product was a light ball-shaped product which could be filtered very easily and washed and which after granulation was dried in the usual drying apparatus and subsequently ground upon addition of a 1% finely dispersed pyrogenically obtained silicic acid. The thus-obtained ground product was not subject to caking. By applying a force to the product it was found that through impact any caking of the grinding product that nevertheless occured could immediately be reversed and the product could easily be loosened up.

Instead of the pyrogenically obtained silicic acid it was also possible to use a wet precipitated acid or a synthetically obtained silicate.

(C) Properties of the vulcanizate

The vulcanization additives as appearing from the table below were then added to the powder by simple stirring. The thus-obtained pulverulent mixture was shaped into strands on a rubber extruder. The strands were then vulcanized to 6 mm. thick test boards immediately following the extrusion step.

For comparative purposes a conventional carbon black-containing solid block product was formed on mixing rollers in conventional manner containing the same ingredients as noted below. By means of the mixing rollers the carbon black was directly incorporated in the solid rubber. The powder mixture of the invention used in the tests comprised 100 weight parts of SBR rubber. The rubber had been made by the process of the invention by coagulating a butadiene-styrene latex and 50 weight parts of activated carbon black.

Table 1 shows the setting up of the mixtures for the comparative tests:

TABLE 1

| Formulation of the vulcanizate | Powder mixture of the invention | Conventional roller mixture |
|---|---|---|
| Powder mixture of the invention as specified above | 150 | |
| Styrene-butadiene rubber (solid) | | 100 |
| Activated carbon black | | 50 |
| Zinc oxide | 3. | 3.0 |
| Stearic acid | 1.0 | 1.0 |
| Benzothiazyl-2 cyclohexyl-sulfenamide | 1.0 | 1.0 |
| Sulfur | 2.0 | 2.0 |

The thus prepared mixtures were then subjected to vulcanization for 25 minutes at 145° C. Thereafter the two vulcanizates were subjected to the DIN Ring examination with the following results:

TABLE 2

| Properties of the vulcanizate | Powder mixture of the invention | Conventional roller mixture |
|---|---|---|
| Tensile strength, kg./cm.² | 236 | 237 |
| Modulus, 300 kg./cm.² | 212 | 208 |
| Elongation, percent | 330 | 343 |
| Rebound elasticity, percent | 40 | 38 |
| Defo hardness | 1,450 | 1,950 |
| Shore hardness | 70 | 72 |
| Notch strength | 11 | 7 |
| Abrasion, mm.³ | 78 | 80 |

The powder mixture of the invention is distinguished by the fact that it can be processed much more easily and has a better storage and shipping stability and results in a high quality vulcanizate. The comparison of the rubber properties in Table 2 shows that the tensile strength (tear resistance), modulus, elongation, elasticity and shore hardness of the vulcanizate of the invention are practically the same as that of the conventional roller mixture. The notch resistance and defo hardness show even better values than the conventional mixture.

What is claimed as new and desired to be protected by Letters Patent is set forth in the appended claims.

We claim:

1. Process of forming an elastomer-carbon black mixture in granulate form comprising forming a dispersion of carbon black in an aqueous acidic medium having a pH of between 1 and 2 and coagulating a natural or synthetic rubber latex in the presence of said acidic aqueous carbon black dispersion and at a pH between 1.5 and 2 to form a granulate wherein said carbon black is present in an amount of 30 to 100 parts by weight referred to 100 parts by weight of said elastomer; then subjecting the granulate to washing, filtering and drying and finally grinding it to form a fine powder of a flour-like consistency which can easily be mixed with vulcanization additives prior to vulcanization.

2. The process of clam 1 wherein a pulverulent or granulated activated carbon is finely dispersed within a time of 2 to 5 minutes in acidified water at room temperature and a pH of between 1 and 2 whereupon the rubber latex is added to the dispersion with intensive stirring during a period of between 5 and 10 minutes followed by coagulation of the latex by addition of acid at a pH between 1.5 and 2.

3. The process of claim 2 wherein the dispersion of the carbon black is effected within a time of about 3 minutes.

4. The process of claim 2 wherein the dispersion of the carbon black is effected by means of a steep velocity gradient mixer.

5. The process of claim 1, wherein the grinding is effected after addition of 0.5 to 5.0 parts by weight, referred to 100 parts of the dried granulate of finely divided silicic acid or silicate as a grinding aid.

6. The process of claim 5 wherein the silicic acid or silicate is added in an amount of about 1 part by weight relative to 100 parts by weight of the total mixture.

References Cited

UNITED STATES PATENTS

| 2,821,232 | 1/1958 | Wolf | 260—763 |
| 3,108,982 | 10/1963 | Barclay | 260—41.5 MP |
| 3,098,837 | 7/1963 | Haxo | 260—41.5 MP |

OTHER REFERENCES

Kraus: Reinformecent of Elastomers, Interscience, N.Y., (1965), pp. 417, 426, and 427.

Noble: Latex in Industry, Rubber Age, Palmerton Pub. Co., Bristol, Conn., 2nd ed. (1963), pp. 233–227.

MORRIS LIEBMAN, Primary Examiner

H. H. FLETCHER, Assistant Examiner

U.S. Cl. X.R.

260—41.5 MP, 763